United States Patent [19]

Elliott

[11] 4,016,757
[45] Apr. 12, 1977

[54] APPARATUS FOR TESTING FLEXIBILITY OF AMMUNITION LINK BELTS

[75] Inventor: Vincent R. Elliott, Raytown, Mo.

[73] Assignee: Remington Arms Company, Inc., Bridgeport, Conn.

[22] Filed: Nov. 5, 1975

[21] Appl. No.: 629,142

[52] U.S. Cl. .............................. 73/167; 73/432 R
[51] Int. Cl.² ..................................... G01M 13/00
[58] Field of Search ................. 73/432 R, 167, 159; 89/33 E; 86/1 R, 45

[56] References Cited

UNITED STATES PATENTS

| | | | |
|---|---|---|---|
| 2,385,052 | 9/1945 | Birk | 73/167 |
| 2,385,116 | 9/1945 | Trimbach | 73/167 |
| 2,401,909 | 6/1946 | Carlzen | 89/33 E |
| 2,403,170 | 7/1946 | Chapman | 89/33 E |

*Primary Examiner*—S. Clement Swisher
*Assistant Examiner*—Denis E. Corr
*Attorney, Agent, or Firm*—John H. Lewis, Jr.; Nicholas Skovran; William L. Ericson

[57] ABSTRACT

Apparatus for testing the flexibility of ammunition link belts by folding the belt longitudinally back on itself in both directions, and also by twisting it about its length. The belt forms a loop in passing between a set of feed sprockets; the radius of the loop increases in the event that any of the links bind and cannot pivot freely on one another, causing the belt to engage a switch which stops the feeding motion of the sprockets. The belt is twisted 180° in passing to a second set of feed sprockets, between which the belt forms a second loop, and engages a second stop switch if the links bind in their inverted positions.

11 Claims, 4 Drawing Figures

APPARATUS FOR TESTING FLEXIBILITY OF AMMUNITION LINK BELTS

BACKGROUND AND BRIEF DESCRIPTION OF THE INVENTION

Ammunition belts for use in automatic rapid-fire weapons must hold the cartridges in correct alignment and with accurate spacing to present them in rapid succesion for proper feeding into the chamber of the weapon. Yet the belt must flex and twist freely in order to feed through the weapon at the required high rate without jamming. The stamped metallic links which make up these belts are subject to becoming distorted during forming, assembly, and attachment of cartridges, so that it is necessary to test the flexibility of the finished, loaded belts to ensure that they will function properly.

It is the general object of this invention to facilitate the testing of ammunition link belts for flexibility. It is a more specific object to provide an improved testing apparatus which, with a continuous feed, folds the belt longitudinally in both directions, twists it about its length through 180°, and automatically discontinues feeding the belt in the event that the links bind and fail to hinge properly.

DESCRIPTION OF THE DRAWINGS

While the specification concludes with claims particularly pointing out the subject matter of the invention, it is believed that a clearer understanding may be gained from the following detailed description of a preferred embodiment thereof, referring to the accompanying drawings, in which:

DETAILED DESCRIPTION OF THE PREFERRED EMBODIMENT

Figure 3:
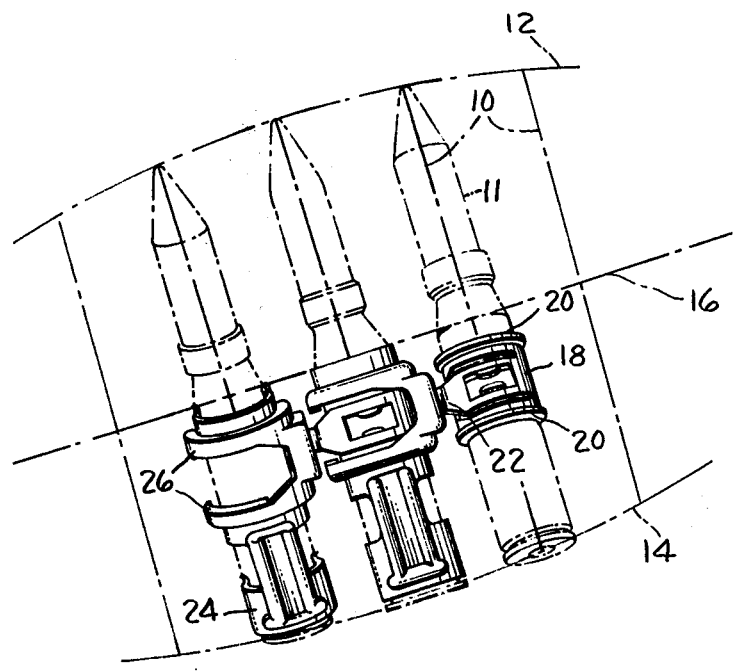
FIG. 3 is an enlarged fragmentary view of a portion of an amunition link belt passing through the apparatus in a twisted condition.

The apparatus is shown in operative association with an illustrative, conventional ammunition link belt, comprising clips 24 which are formed with half-round jaws to snap elastically onto cartridges 11, and semi-circular links 18 each attached by an integral tang 22 to an adjacent clip 24 in a manner to permit relative twisting movement. Each link 18 is formed with a pair of semi-circular flanges 20 (see FIG. 3) which are rotatably received inside a pair of circumferentially-extending channels 26 formed in the clip 24 associated with the same cartridge. While the belt as a whole is thus free to bend longitudinally in either direction, as well as to twist about its length dimension, the cartridges 11 are supported with a fixed spacing, shown at X in FIG. 1, between their longitudinal axes 10, so as to feed correctly into an automatic weapon. However it sometimes occurs that the clips 24 and links 18 become bent or distorted during manufacture and assembly of the belt, so that adjacent links are not free to rotate and twist relative to one another. The improved testing apparatus serves to locate such defects by bending the belt back on itself through a 180° turn, twisting it about its longitudinal centerline through an angle of 180°, and then bending the belt back on itself 180° in an opposite direction to the first bend. If the belt binds and fails to follow these flexures properly, advantage is taken of the resulting distorted shape of the belt, and its deviation from a normal path, to stop the belt feed by means of stop switches positioned adjacent to the normal path of the belt.

Figure 4:
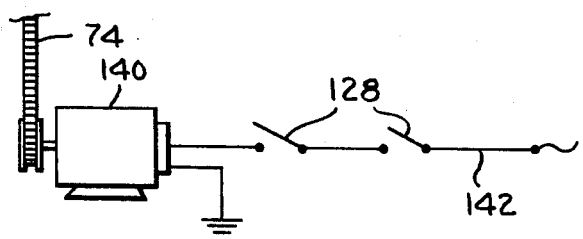
FIG. 4 is a diagram showing an electrical control circuit for the apparatus.

The testing apparatus is assembled on a frame which comprises a mounting plate 62, beams 63 and 65, braces 68 and 70, and a rear plate 66, connected by suitable fasteners. Four shafts 44, 48, 52, and 56 are rotatably supported in parallel relation by means of four pairs of bearing blocks 60 and 64 mounted on the beams 63 and 65. The shafts are driven with equal angular velocity and in a common direction of rotation, shown by the arrows in FIG. 1, by a drive motor 140 (shown in FIG. 4) and a drive chain 74 trained around a sprocket 76; a chain 80 trained around sprockets 78 and 82; a chain 86 trained around sprockets 84 and 88; and a chain 92 trained around sprockets 90 and 94. These sprockets are secured to the various shafts as shown by means of pins 77, and are all of the same diameter.

Two pairs of belt feed sprockets 32 and 34 are mounted on ends of the shafts 44 and 48 projecting forwardly of the mounting plate 62, and drivingly connected with the shafts by keys 33 received in keyways 37. The sprockets 32 and 34 are spaced apart and positioned axially of the shafts by sets of spacers 42 and 46, which are interconnected by screws 41, and positioned on the shafts by set-screws 35. Similarly, two pairs of belt feed sprockets 36 and 38 are mounted on projecting ends of the shafts 52 and 56, drivingly connected by keys 33, and positioned by sets of spacers 50 and 54.

The ammunition link belt to be tested is trained through the apparatus along a path indicated by its longitudinal centerline 16, with the noses of the cartridges 11 following a partly-curved path 12, and the heads following the path 14. The tooth size and spacing of the belt feed sprockets 32 and 34 is appropriate to conformably engage successive cartridges 11 and clips 24 in a nose-forward position, while that of the sprockets 36 and 38 is suitable for a head-forward position. A pair of discs 40 is mounted with the sets of spacers 50 and 54 in positions to guide the cartridge heads in their passage about the belt feed sprockets 36 and 38.

The ammunition link belt is passed from the feed sprockets on the shaft 44 through a depending loop before reaching the feed sprockets on the shaft 48. A divider plate 98 and a backup bar 108 are mounted on the plate 62 to aid in defining the limits of this loop, the bar 108 being adjustably positioned by means of slots 109 slidably receiving its mounting screws 110. A similar depending loop is formed in the ammunition belt between the belt feed sprockets of the shafts 52 and 56, with another divider plate 98 and backup bar 108 serving to define limits to the form of the loop. Between the two loops, the ammunition belt is twisted about its longitudinal centerline 16 through an angle of 180° as shown, thus confirming that the tang 22 of each link 18 is free to twist properly with respect to the adjacent clip 24 to which it is connected. This twisting also causes the belt to become inverted, in the loop between the shafts 52 and 56, from its original position in the loop between the shafts 44 and 48. Thus the ammunition belt is twisted back on itself 180° in one direction in the first loop, and 180° in the opposite direction in the second loop.

Assuming for purposes of illustration that the clips 24 and links 18 passing through the first loop between the shafts 44 and 48 are free to rotate about the cartridge axes 10 with respect to one another, an acute angle A is formed at the bottom of the loop between adjacent segments of the centerline 16, when three cartridges form an inverted isosceles triangle as shown. After the belt feeds forwardly a bit further, two cartridges will hang side-by-side at the same elevation, with angles of 90° between adjacent segments of the centerline 16. At no stage will the horizontal distance between cartridges at the bottom of the loop exceed the horizontal distance between the locations of the pitch diameters of the belt feed sprockets on the shafts 44 and 48, if this is at least as great as the spacing X between the cartridges 11. Consequently, the dependent spans leading to and from the loop either remain substantially vertical, or converge downwardly, depending on the spacing between the belt feed sprockets.

It is assumed in the illustration that there is a binding condition, preventing free rotation between one or more of the clips 24 and links 18, in the second belt loop formed between the feed sprockets on the shafts 52 and 56. The result is that the angle B formed between adjacent segments of the centerline 16 is larger than the angle A, and the loop follows a larger turning radius, which causes the dependent belt spans leading to and from the loop to diverge downwardly, and the loop to acquire an enlarged horizontal dimension.

Such increases in loop size therefore provide an indication of binding in the ammunition belt, and are detected by means of normally-closed micro-switches 128, one associated with each loop. Each switch has a pivotally-attached actuator arm 134, which is operable to open the switch by a clockwise movement of a lever arm 112 that is pivotally mounted, by means of a bracket 115 bearing a hinge pin 114, on the plate 62. Each lever 112 is urged in a counterclockwise direction by a tension spring 116 against an adjustable stop screw 126. The tension in the spring 116 is adjustable by means of a screw 118, and this spring and the stop screw 126 are mounted on a bracket 120 which is adjustably positioned on the plate 62 by a mounting screw 124 slidably received through an elongated slot 122.

Figure 1:
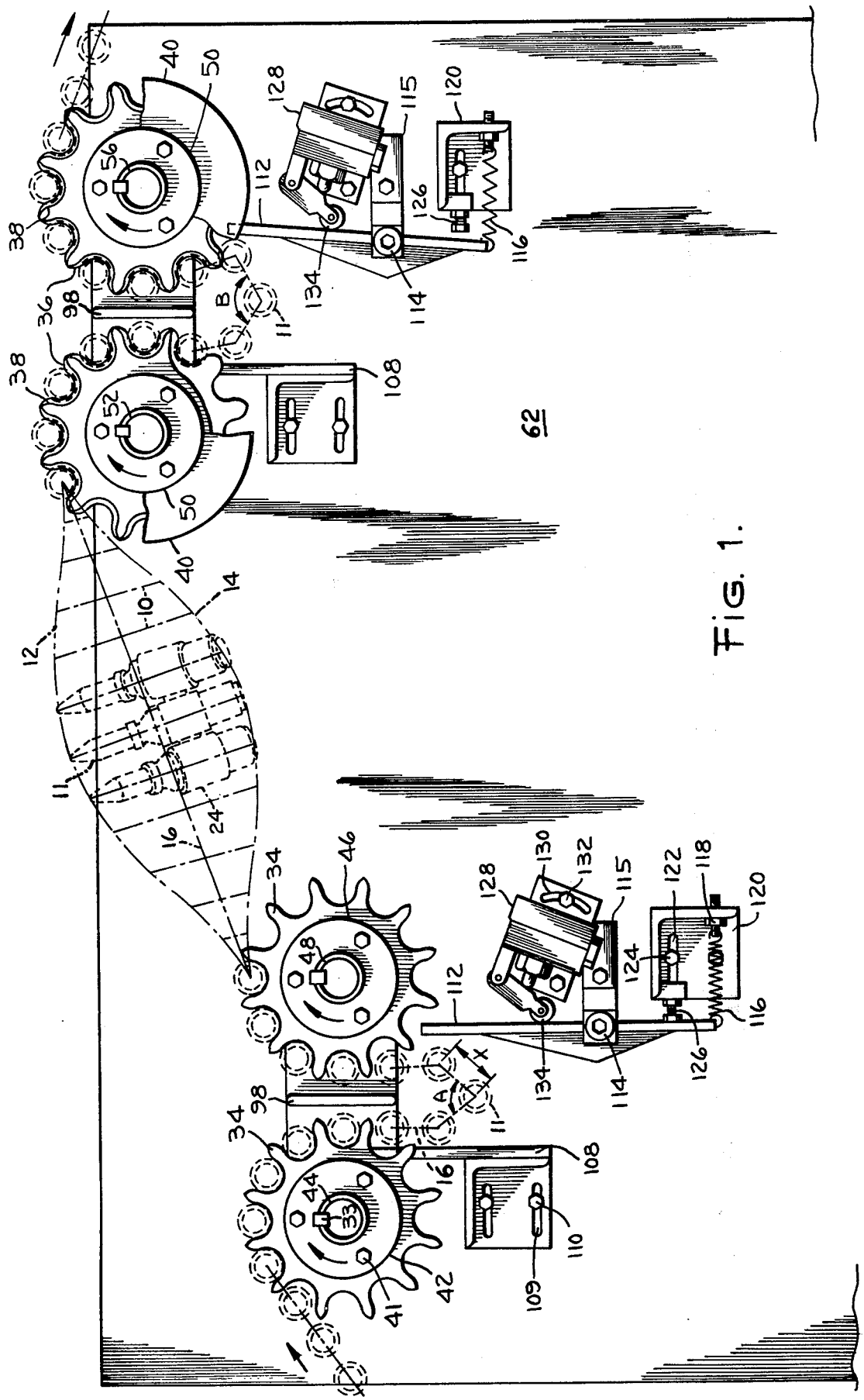
FIG. 1 is a fragmentary view in front elevation of a testing apparatus made in accordance with the invention.
Figure 2:
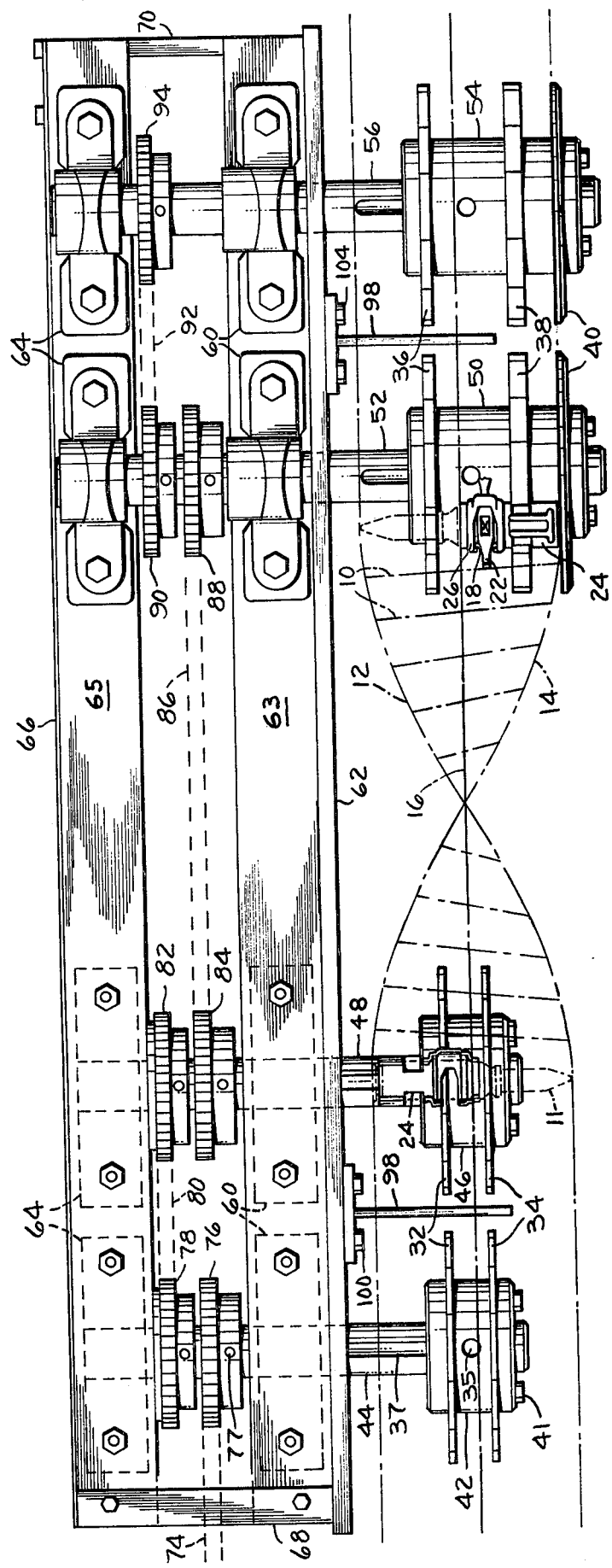
FIG. 2 is a plan view of the apparatus.

The lever arms 112 are located adjacent to the two belt loops in such positions that they abut against their stops 126 when the loops remain of normal size, as the loop at the left in FIG. 1 is shown, allowing the switches 128 to remain closed. However, an enlargement of either loop resulting from binding of the belt engages the corresponding lever arm 112 and tilts it clockwise, opening the associated switch 128, as is shown at the right side of FIG. 1.

The two switches 128 are connected in series with an electrical lead 142 (see FIG. 4) arranged to normally energize the drive motor 140 for driving the belt feed sprockets as previously described. Actuation of either switch by enlargement of either belt loop de-energizes the drive motor, immediately discontinuing the feeding of the ammunition link belt so that the binding condition can be located and corrected. The switches 128 comprise position-sensor means responsive to enlargement of the belt loops, and this function could be served by other means, such as light-responsive photocelss, pneumatic or hydraulic valve means operable by the lever arms 112, or other conventional position sensors.

What I claim is:

1. Apparatus for testing the flexibility of ammunition link belts, comprising in combination:

means for feeding an ammunition link belt longitudinally through a predetermined path which includes a first dependent loop in which the belt is longitudinally reversed in direction with a first side of the belt facing the outside of said first loop, a span in which the belt is twisted about its longitudinal axis, and a second dependent loop in which the belt is longitudinally reversed in direction with a second side of the belt facing the outside of said second loop;

and sensor means constructed and arranged for detecting enlargement of either of said loops from a normal size, incident upon feeding through said loops of relatively inflexible portions of the belt.

2. Apparatus as recited in claim 1, said sensor means being operatively connected to discontinue operation of said feeding means in response to detection of an enlargement of either of said loops.

3. Apparatus as recited in claim 1, said sensor means comprising position sensors responsive to displacements of the belt outside the normal positions of either of said loops.

4. Apparatus as recited in claim 1, said sensor means comprising:

a pair of movably-supported lever means each located outside and adjacent to the normal position of a corresponding one of said loops;

means limiting displacement of each of said lever means toward the belt at a stop position spaced from the normal position of the corresponding loop;

means biasing each of said lever means toward said stop position thereof;

and switch means operatively associated with said lever means for actuation thereby in response to a displacement of either of said lever means from said stop position thereof by an outward displacement of the belt from said normal position of either of said loops.

5. Apparatus as recited in claim 4, together with circuit means operatively connected for energizing said feeding means; said switch means being connected in series in said circuit means for normally closing said circuit means, and for opening said circuit means to de-energize said feeding means upon actuation of either of said switch means by said lever means.

6. Apparatus as recited in claim 1, said sensor means comprising a pair of switch means each normally in a first state, each of said switch means being located outside and adjacent to the normal position of a corresponding one of said loops and each actuable to a second state by displacement of the belt outside the corresponding loop; together with circuit means incorporating said switch means and operatively connected for energizing said feeding means when both of said switch means are in said first state, and for de-energizing said feeding means when either of said switch means is in said second state.

7. Apparatus as recited in claim 1, in which said feeding means comprises four parallel spaced-apart rotatable shafts each having means for engaging and feeding said belt, a first pair of said shafts forming said first dependent loop therebetween, a second pair of said shafts forming said second dependent loop therebetween, said twisted span being formed between said first and second pairs of shafts.

8. Apparatus for testing the flexibility of ammunition link belts, comprising in combination:
- means for engaging an ammunitiion link belt at longitudinally-spaced points thereon and feeding the belt longitudinally, said engaging and feeding means being constructed and arranged to form a section of the belt extending between said longitudinally-spaced points into a loop hanging freely therebetween and reversing the feeding direction of the belt from a downward to an upward direction;
- and sensor means for detecting distortions of said section of the belt from a normal free-hanging loop form assumed when said section is flexible, said sensor means being operatively connected to discontinue feeding of the belt by said engaging and feeding means in response to detection of a distortion of said section of the belt from said normal free-hanging loop form.

9. Apparatus as recited in claim 8, said sensor means being constructed and arranged to detect an enlargement of said loop.

10. Apparatus as recited in claim 8, together with a second means for engaging and feeding the belt at further longitudinally-spaced points thereon spaced in the feeding direction from said first-mentioned section of the belt, said first and second engaging and feeding means being adapted to twist the belt about the length dimension thereof in a span of the belt extending from said first to said second engaging and feeding means, said second engaging and feeding means being constructed and arranged to form a second section of the belt extending between said further points thereon into a second loop reversed 180° from said first loop, hanging freely between said further points, and reversing the feeding direction of the belt from a downward to an upward direction;
- and second sensor means for detecting distortions of said second section of the belt from a normal free-hanging loop form assumed when said second section is flexible.

11. Apparatus as recited in claim 10, said first and second sensor means being operatively connected to discontinue feeding of the belt by said first and second engaging and feeding means, in response to detection by either of said first and second sensor means of a distortion of either of said first and second sections of the belt from said normal free-hanging loop form.

* * * * *